United States Patent
Sjödin et al.

(10) Patent No.: US 12,074,733 B2
(45) Date of Patent: Aug. 27, 2024

(54) METHOD AND APPARATUS FOR PHASE-AIDED ADAPTIVE MODULATION

(71) Applicant: Telefonaktiebolaget LM Ericsson (publ), Stockholm (SE)

(72) Inventors: Martin Sjödin, Gothenburg (SE); Björn Gävert, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 309 days.

(21) Appl. No.: 17/630,750

(22) PCT Filed: Jul. 29, 2019

(86) PCT No.: PCT/SE2019/050714
§ 371 (c)(1),
(2) Date: Jan. 27, 2022

(87) PCT Pub. No.: WO2021/021007
PCT Pub. Date: Feb. 4, 2021

(65) Prior Publication Data
US 2022/0263687 A1 Aug. 18, 2022

(51) Int. Cl.
*H04L 25/02* (2006.01)
*H04L 27/34* (2006.01)

(52) U.S. Cl.
CPC ...... *H04L 25/0224* (2013.01); *H04L 27/3455* (2013.01)

(58) Field of Classification Search
CPC ............. H04L 25/0224; H04L 27/3455; H04L 25/0226; H04L 25/0228; H04L 27/04; H04L 27/364; H04L 27/0008; H04Q 11/04
See application file for complete search history.

(56) References Cited

U.S. PATENT DOCUMENTS

| 6,608,843 | B1 | 8/2003 | Murakami et al. |
| 2010/0061487 | A1 | 3/2010 | Kumar et al. |
| 2013/0235919 | A1 | 9/2013 | Plevel |
| 2014/0140432 | A1 | 5/2014 | Weinholt et al. |

(Continued)

FOREIGN PATENT DOCUMENTS

| EP | 0951151 A2 | 10/1999 |
| EP | 1022874 A2 | 7/2000 |

(Continued)

OTHER PUBLICATIONS

International Search Report and the Written Opinion of the International Searching Authority, issued in corresponding International Application No. PCT/SE2019/050714, dated May 29, 2020, 11 pages.

*Primary Examiner* — Kabir A Timory
(74) *Attorney, Agent, or Firm* — Rothwell, Figg, Ernst & Manbeck, P.C.

(57) ABSTRACT

The present invention relates to a method and apparatus in a digital communication system that employs phase-aided adaptive modulation to overcome phase noise impairments. The transceiver is configured to transmit a message comprising channel symbols from a primary and a secondary set of channel symbols, wherein the primary set of channel symbols comprises channel symbols having different phase with respect to one another and the secondary set of channel symbols comprises only channel symbols with a fixed known phase.

12 Claims, 6 Drawing Sheets

(56) References Cited

U.S. PATENT DOCUMENTS

| | | | | |
|---|---|---|---|---|
| 2015/0003571 A1* | 1/2015 | Nammi | ............... | H04L 25/0204 |
| | | | | 375/340 |
| 2015/0085960 A1* | 3/2015 | Kamiya | .................. | H04L 27/22 |
| | | | | 375/346 |
| 2016/0248558 A1* | 8/2016 | Murakami | ............ | H04L 5/0032 |
| 2019/0223026 A1* | 7/2019 | Hasegawa | ........... | H04W 72/541 |

FOREIGN PATENT DOCUMENTS

| | | |
|---|---|---|
| WO | 2007008036 A2 | 1/2007 |
| WO | 2008069556 A1 | 6/2008 |
| WO | 2013007275 A2 | 1/2013 |

\* cited by examiner

FIG. 1 (KNOWN ACM SYSTEM)

METHOD AND APPARATUS FOR PHASE-AIDED ADAPTIVE MODULATION

CROSS REFERENCE TO RELATED APPLICATION(S)

This application is a 35 U.S.C. § 371 National Phase Entry Application from PCT/SE2019/050714, filed Jul. 29, 2019, designating the United States, the disclosure of which is incorporated herein by reference in its entirety.

TECHNICAL FIELD

The present invention relates to a method and apparatus in a communication system that employs phase-aided adaptive modulation to overcome phase noise impairments.

BACKGROUND

Adaptive modulation, or adaptive coding and modulation, has over the last decades become widely employed in various digital communication systems. The basic idea is to provide the communication system with the ability to adapt the spectrum efficiency of the communication signal to better match the channel conditions. This can be achieved by having observed channel conditions, as seen by the receiver, communicated to the transmitter.

FIG. 1 illustrates the block diagram of a known digital communication system employing adaptive coding and modulation. An information word, i.e. a bit sequence of a specified length, is encoded by an FEC encoder which outputs a codeword that is passed on to a signal mapper. The signal mapper sequentially maps one or several bits of the codeword to a channel symbol. Adaptive modulation requires that the signal mapper supports several signal constellations, e.g. M-QAM where M is 4, 16, 64, 256, 1024 and so on. Typically, the FEC encoder and the signal mapper receives observed channel conditions, e.g. signal-to-noise ratio (SNR), from a channel estimation unit in the far-end receiver and then adapts the code, the code rate and the signal constellation in response to any change in the transmission channel. The channel symbols are passed on to a TX modulator comprising transmit filters and radio hardware for up-converting a baseband signal to a radio frequency (RF) and is further connected to an antenna for transmitting the RF signal. In the far-end receiver, an antenna for receiving the RF signal is connected to an RX demodulator, comprising receive filters and radio hardware for down-converting the received RF signal to baseband and detecting the received channel symbols. The signal demapper returns the received symbols to bit representation and outputs a sequence of channel reliability metrics, e.g. log-likelihood ratios. The channel reliability metrics are passed on to the FEC decoder which ideally finds the most likely codeword and outputs the associated information word.

Phase noise is a well-known impairment in many digital communication systems and causes random rotations of the received signal constellation. The random rotations may severely limit the performance of communication systems with dense signal constellations such as high-order QAM. Adaptive in modulation systems utilizing large and dense QAM constellations may thus be particularly ill-suited to phase noise impairments.

The most common mitigation method for phase noise is to apply an algorithm which estimates the phase noise and compensates the received signal. These algorithms are generally pilot-aided, i.e. known symbols are periodically inserted into the payload stream to provide a phase reference. The main drawback of using pilots is a reduction in data rate, as they do not carry any data. WO 2013/007275 A2 discloses a scheme that recovers some of the data rate loss by using QPSK payload symbols as phase references, or other constellations with symbols in two or four signal quadrants, i.e. with either two or four phase states. However, using QPSK symbols as phase reference symbols introduce phase ambiguity and may thus reduce the tolerance to frequency offset and phase noise.

In view of the above, there is a need to provide a communication system that provides pilots that can both carry data and have no phase ambiguity. Moreover, there is a need to provide an adaptive modulation system that can adapt its communication to a transmission channel with phase noise impairments.

SUMMARY

It is an object of the present invention to remedy, or at least alleviate, some of these drawbacks and to provide a digital communication system that improves the performance over phase noise impaired transmission channels.

According to a first aspect, the invention describes a transceiver for phase-aided communication. The radio transceiver comprise a transmitter configured to transmit a message comprising channel symbols from a primary and a secondary set of channel symbols. The primary set of channel symbols comprises channel symbols having different phase with respect to one another. The secondary set of channel symbols comprises only channel symbols with a fixed known phase. The primary set is the default channel symbol set and the secondary set is selected based on a predetermined sequence or with regard to the level of phase noise.

According to a second aspect, the invention describes a method in a transceiver, the radio transceiver being configured to transmit a message comprising channel symbols from a primary and a secondary set of channel symbols. The method is comprising the step of selecting a channel symbol from either the primary or the secondary set of channel symbols, wherein the primary set of channel symbols comprises channel symbols having different phase with respect to one another and is the default channel symbol set, and the secondary set of channel symbols comprises only channel symbols with a fixed known phase and is selected based on a predetermined sequence or with regard to the level of phase noise. The method is further comprising the step of transmitting the channel symbol.

The above transceiver and method provide an adaptive modulation system that can adapt its communication to a transmission channel with phase noise impairments. Moreover, the above transceiver and method provide pilots that both carry data and have no phase ambiguity.

The drawings are not necessarily to scale and the dimensions of certain features may have been exaggerated for the sake of clarity, emphasis is instead being placed upon illustrating the principle of the embodiments herein.

DETAILED DESCRIPTION

Four embodiments of the present invention are described in detail below with reference to FIGS. 1-6. A first and a second embodiment of the invention relate to a transceiver 200 and a third and fourth embodiment relate to a method in a transceiver 200. It should be noted that the scope of the present invention is not limited to the particular embodiments described herein, but only limited by the appended claims.

The following abbreviations are used in the text and the drawings:
ASK Amplitude Shift Keying
FEC Forward Error Correction
QAM Quadrature Amplitude Modulation
QPSK Quadrature Phase Shift Keying
RF Radio Frequency
RX Receive
SNR Signal-to-Noise Ratio
TX Transmit The present invention relates to a method and apparatus in a digital communication system that employs phase-aided adaptive modulation to overcome phase noise impairments. The invention may be used for both wireless and wired communication links, including optical fiber. The invention may also be used for communication between nodes in any type of access network, including wireless access and backhaul traffic.

The first and second embodiments relate to a transceiver 200 for phase-aided communication.

In the following, features of the first embodiment are described with reference to FIGS. 2-4. The first embodiment relates to a transceiver 200 comprising a transmitter 210 configured for phase-aided adaptive modulation.

Figure 1:
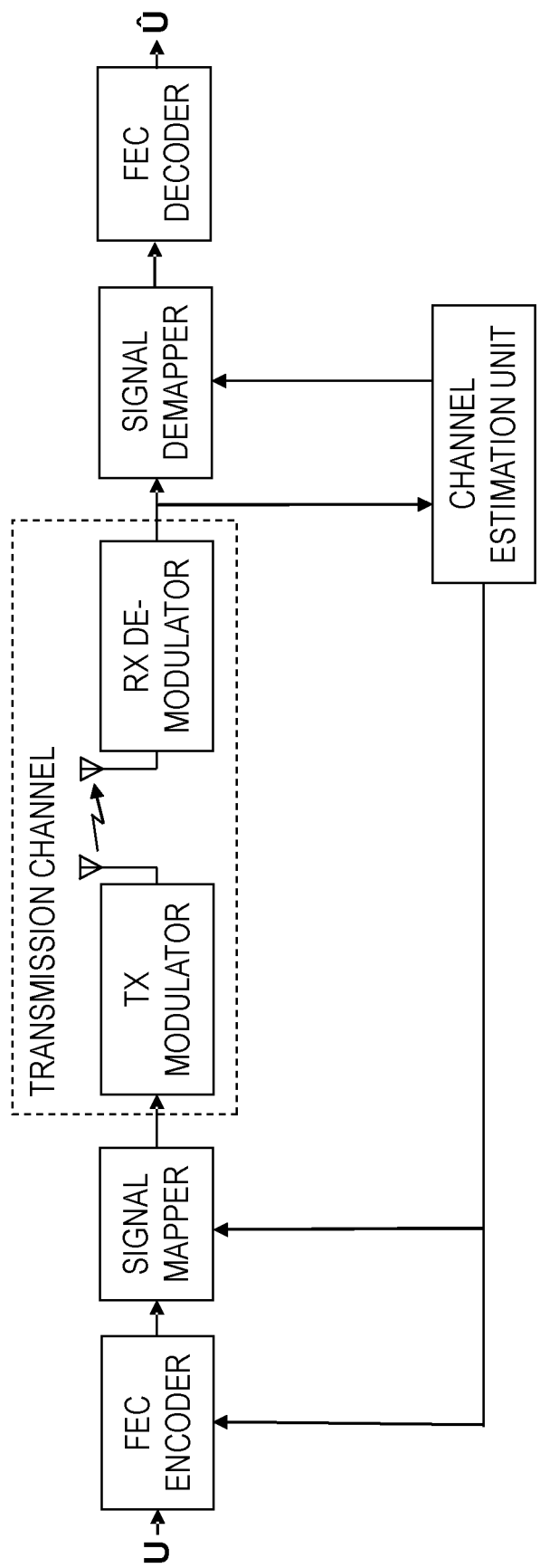
FIG. 1 shows schematically a block diagram of a known communication system employing adaptive coding and modulation.
Figure 2:
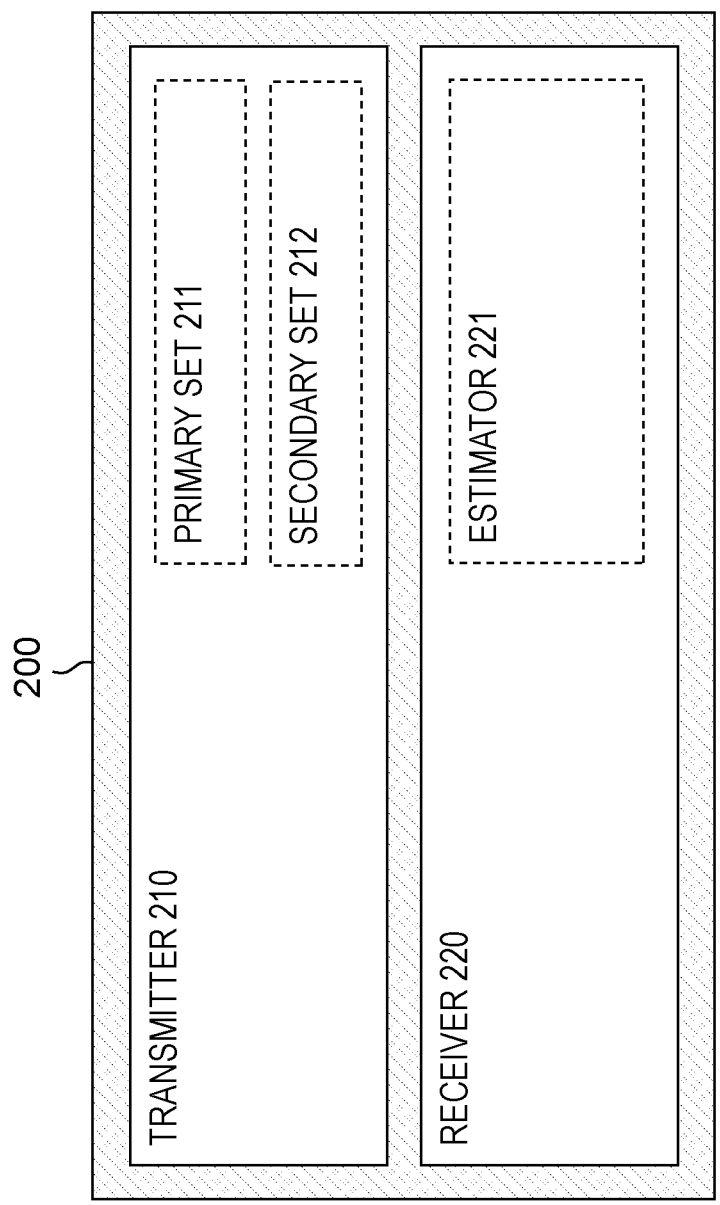
FIG. 2 shows schematically in a block diagram a first and a second embodiment of the invention.

FIG. 2 depicts a transceiver 200 in accordance with the first and second embodiments. A transceiver is a device that comprises both a transmitter 210 and receiver 220 that may share common circuitry and/or a single housing. The transceiver 200, according to the first embodiment, comprises a transmitter 210 configured to transmit a message comprising channel symbols from a primary set of channel symbols 211 and a secondary set of channel symbols 212.

The primary set of channel symbols 211 comprises channel symbols having different phase with respect to one another. The channel symbols 211 may also have different amplitude. The purpose of the primary set 211 is to carry data traffic over the transmission channel. The primary set of channel symbols may be, for example, an M-QAM constellation, where M is the number of signal points in the QAM constellation. Typically, the number of signal points M is one of 4, 16, 64, 256, 1024, 4096. The transmitter may be configured to adapt the signal constellation and its size M to the channel conditions, e.g. SNR, multi-path fading and/or phase noise, as observed by the receiver. Preferably, the transmitter is configured to select the signal constellation, i.e. a set of channel symbols, that maximizes the data rate over the transmission channel.

The secondary set of channel symbols 212 comprises only channel symbols with a fixed known phase. The main purpose of the secondary set 212 is to provide a known phase, i.e. a phase pilot, to the far-end receiver. Conventionally, pilots do not carry any data traffic, but having channel symbols not carrying any data traffic is a wasteful use of bandwidth resources. Another purpose of the secondary set 212 is therefore to carry data while still adhering to the restriction of the fixed known phase. For example, the secondary set of channel symbols may be an M-ASK constellation, where the constellation size M is greater than or equal to 2. To ensure that additive noise of the transmission channel does not corrupt the received pilot in the far-end receiver, the secondary set may further have a minimum signal energy $E_{S,MIN}$. Preferably, the minimum signal energy is dependent on the signal-to-noise-ratio or signal-to-interference-and-noise-ratio of the transmission channel.

Figure 3:
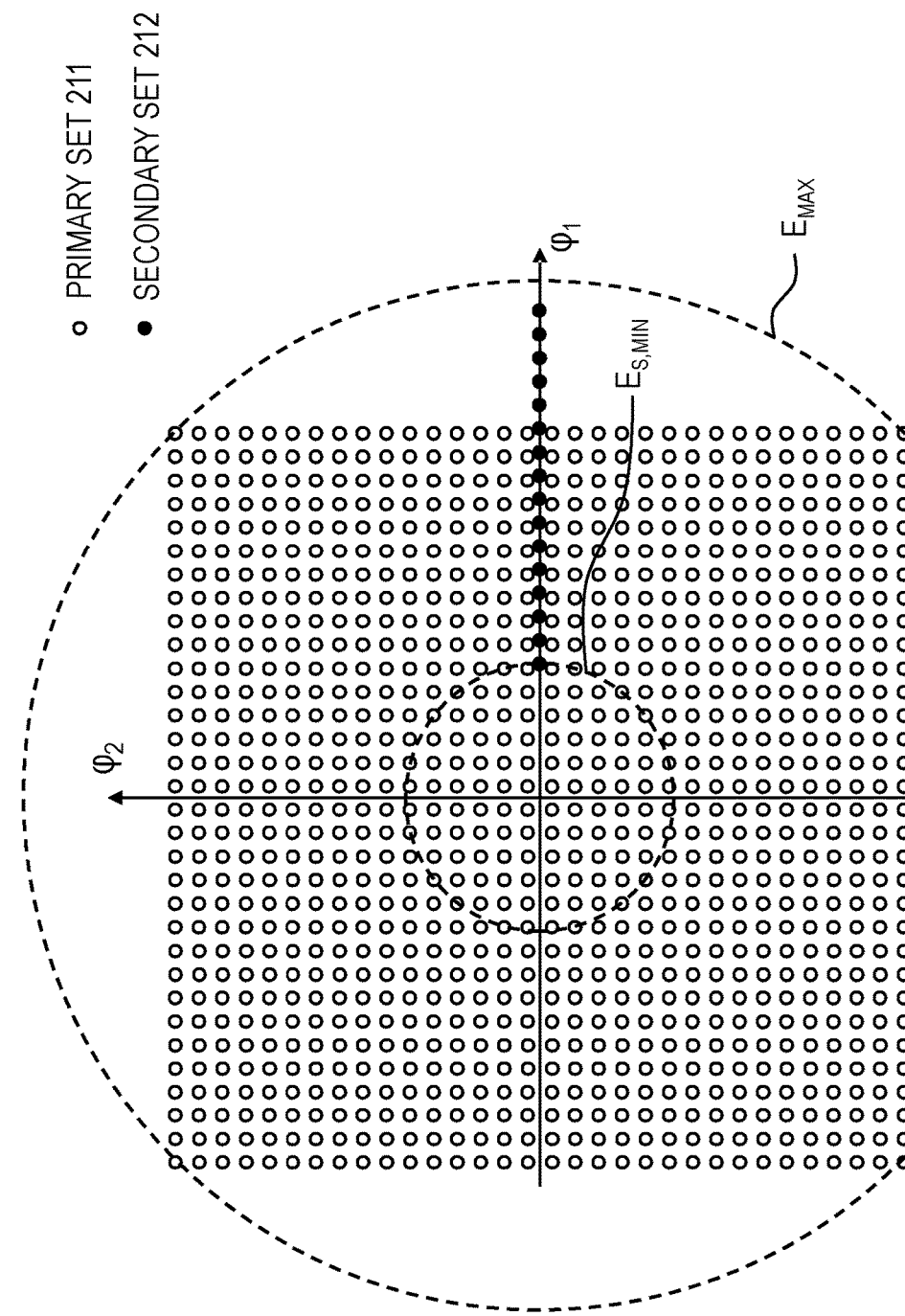
FIG. 3 shows examples of the signal constellations of the primary and secondary set of channel symbols.

FIG. 3 shows examples of the signal constellations of the primary and secondary set of channel symbols. The primary set is here a 1024-QAM and the secondary set is a 16-ASK with minimum signal energy $E_{S,MIN}$. FIG. 3 also depicts the maximum signal energy $E_{MAX}$ for the two signal constellations. In one aspect, the minimum distance between any two channel symbols in the primary set and secondary set is essentially the same. Thus, each primary set is then associated with a secondary set having essentially the same minimum distance. In another aspect, the average signal energies of the primary and secondary sets are essentially the same.

Figure 4:
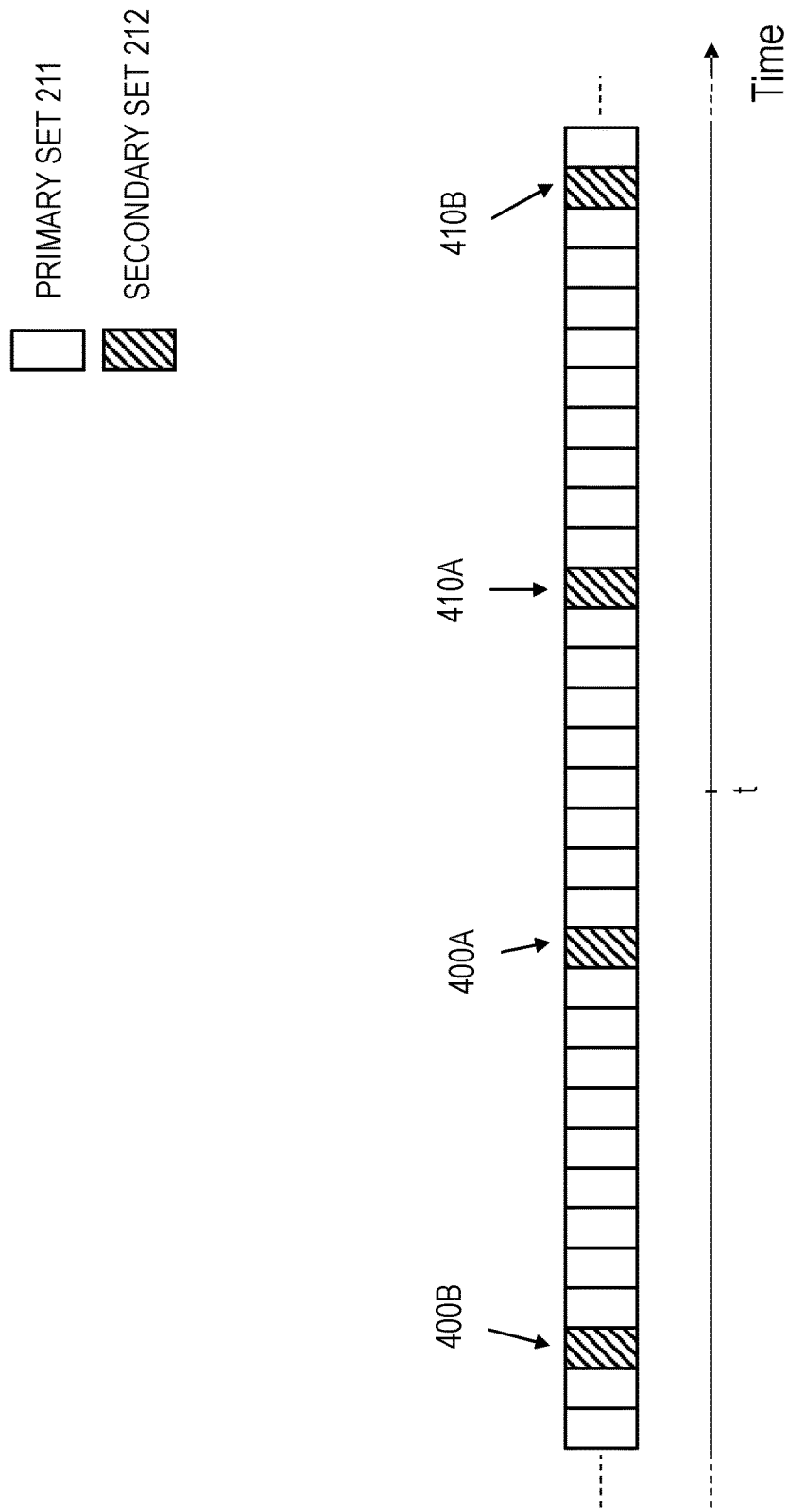
FIG. 4 shows schematically in a block diagram an example of a transmitted/received message comprising channel symbols from both the primary and secondary sets.

FIG. 4 shows an example on how the primary and secondary sets may have been assigned to channel symbols in a transmitted message. The primary set 211 is the default channel symbol set. Ideally, the secondary set 212 is used only when the phase noise estimate in the far-end receiver needs to be improved. For example, the secondary set 212 may be selected based on a predetermined sequence. Here, the predetermined sequence could also be a predetermined rate. The secondary set 212 may further be selected based in on the level of phase noise. In such case, an increase in the level of phase noise would result in a higher incidence of secondary set channel symbols. The level of phase noise may be obtained by feedback from the far-end receiver. The level of phase noise does not need to be the exact value of the phase noise. For example, the receiver may take the magnitude of the phase error for a large number of received pilot symbols, determine whether the level of phase noise is too high, satisfactory or too low and then communicate said level to the transmitter. In another aspect, if the transmitter and receiver share the same oscillator on both sides of the communication link, the level of phase noise in the far-end receiver may be approximated by the level of phase noise in the near-end receiver 220.

In the following, features of the second embodiment are described with reference to FIGS. 2-4. The second embodiment relates to a transceiver 200 comprising a receiver 220 configured for phase-aided adaptive modulation.

The receiver 220 of the transceiver 200 may, according to the second embodiment, further be configured to receive a message comprising channel symbols from the primary set of channel symbols 211 and the secondary set of channel symbols 212.

FIG. 4 may also be used as an example on how the primary and secondary sets can be associated to channel symbols in a received message. In the receiver 220, the received channel symbols associated with the secondary set 212 provides a known phase. A phase error can be determined by subtracting the known phase from the received channel symbol. At a given time t, any preceding channel symbol of the secondary set in the received message can be used to determine a preceding phase error 400A, 400B. Likewise, any subsequent channel symbol of the secondary set can be used to determine a subsequent phase error 410A, 410B. The receiver 220 is configured to determine a preceding phase error from a preceding received channel symbol, wherein the preceding received channel symbol is from the secondary set of channel symbols 212. The receiver is further configured to in compute a phase error estimate for a received channel symbol, wherein the phase error estimate is obtained from an estimator 221 having at least the preceding phase error as input. A simple realization of the estimator 221 is to provide a phase error estimate that is equal to the nearest preceding phase error in time. Alternatively, the estimator 221 may be a digital filter that take multiple preceding phase errors into account. Finally, the receiver is also configured to compensate for phase noise in the received channel symbol by subtracting the phase error estimate from the received channel symbol.

The receiver may further be configured to determine a subsequent phase error from a subsequent received channel symbol, wherein the subsequent received symbol is from the secondary set of channel symbols 212. The estimator 221 is then configured to also have the subsequent phase error as input. A simple realization of the estimator 221 in this case is one that provides a linear interpolation between the nearest preceding and subsequent phase errors in time. Alternatively, the estimator 221 may be a digital filter that takes multiple preceding phase errors and multiple subsequent phase errors into account. For example, the estimator 221 may be a forward-backward Wiener filter that takes multiple preceding and subsequent phase errors as input.

If the transceiver 200 is configured for radio communication, the transceiver can further be configured to comprise an antenna arrangement connected to the receiver and the transmitter and configured to transmit and receive radio frequency signals. The antenna arrangement may be any type of antenna and with any number of antenna elements.

The third and fourth embodiments relate to a method in transceiver 200 for phase-aided communication.

In the following, features of the third embodiment are described with reference to FIGS. 2-5. The third embodiment relates to a method in a transceiver 200 configured for communication comprising channel symbols from a primary and a secondary set of channel symbols 211, 212.

Figure 5B:
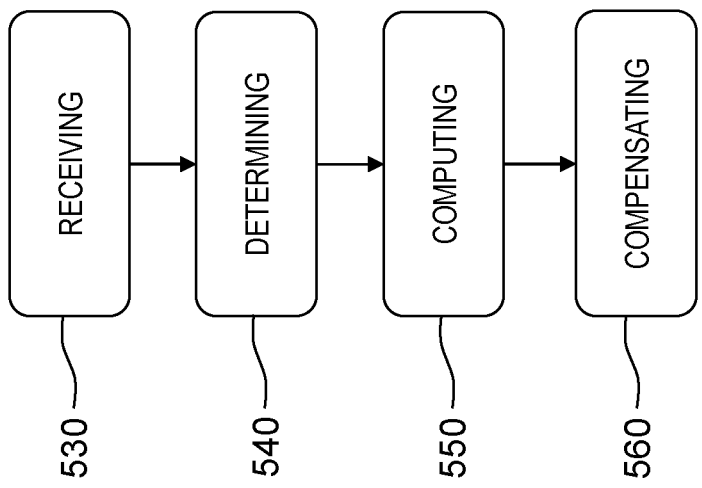
FIG. 5B shows schematically in a flowchart a method according to the fourth embodiment of the invention.
Figure 5A:
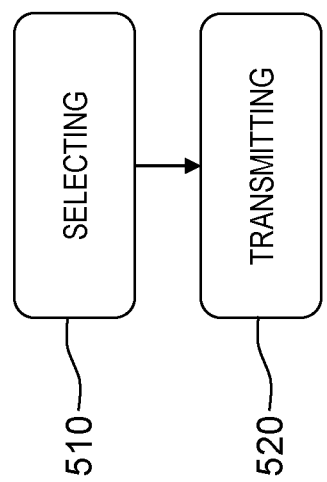
FIG. 5A shows schematically in a flowchart a method according to the third embodiment of the invention.

FIG. 5A shows a flowchart of the method according to the third embodiment. The method comprises the step of selecting 510 a channel symbol from either the primary or the secondary set of channel symbols 211, 212. If the transmit message comprises N channel symbols, the step of selecting comprises selecting a channel symbol from either the primary or the secondary set of channel symbols 211, 212 for each of the N channel symbols. The method further comprises the step of transmitting 520 the channel symbol. If the transmit message comprises N channel symbols, the step of transmitting comprises transmitting each of the N channel symbols.

The primary set of channel symbols 211 comprises channel symbols having different phase with respect to one another. The channel symbols 211 may also have different amplitude. The primary set is the default channel symbol set. The purpose of the primary set 211 is to carry data traffic over the transmission channel. The primary set of channel symbols may be, for example, an M-QAM constellation, where M is the number of signal points in the QAM constellation. Typically, the number of signal points M is one of 4, 16, 64, 256, 1024, 4096. The transceiver may be configured to adapt the constellation size M to the channel conditions, e.g. SNR, multi-path fading and/or phase noise, as observed by the receiver. Preferably, the transceiver is configured to select the signal constellation, i.e. a set of channel symbols, that maximizes the data rate over the transmission channel.

The secondary set of channel symbols 212 comprises only channel symbols with a fixed known phase. Selecting 510 the secondary set of channel symbols 212 is based on a predetermined sequence or with regard to the level of phase noise. The main purpose of the secondary set 212 is to provide a known phase, i.e. a phase pilot, to the far-end receiver. Conventionally, pilots do not carry any data traffic, but having channel symbols not carrying any data traffic is wasteful use of bandwidth resources. Hence, another purpose of the secondary set 212 is to carry data while still adhering to the restriction of the fixed known phase. For example, the in secondary set of channel symbols may be an M-ASK constellation, where the constellation size M is greater than or equal to 2. To ensure that additive noise of the transmission channel does not corrupt the received pilot in the far-end receiver, the secondary set may further have a minimum signal energy $E_{S,MIN}$. Preferably, the minimum signal energy is dependent on the signal-to-noise-ratio or signal-to-interference-and-noise-ratio of the transmission channel.

FIG. 3 shows examples of the signal constellations of the primary and secondary set of channel symbols. The primary set is here a 1024-QAM and the secondary set is a 16-ASK with minimum signal energy $E_{S,MIN}$. FIG. 4 also depicts the maximum signal energy $E_{MAX}$ for the two signal constellations. In one aspect, the minimum distance between any two channel symbols in the primary set and secondary set is essentially the same. Thus, each primary set is then associated with a secondary set having essentially the same minimum distance. In another aspect, the average signal energies of the primary and secondary sets are essentially the same FIG. 4 shows an example on how the primary and secondary sets may be assigned to channel symbols in the step of selecting 510. The primary set 211 is the default channel symbol set. Ideally, the secondary set 212 is used only when the phase noise estimate in the far-end receiver needs to be improved. For example, selecting 510 the secondary set 212 may be based on a predetermined sequence. Here, the predetermined sequence could also be a predetermined rate. Selecting 510 the secondary set 212 may further be based on the level of phase noise. In such case, an increase in the level of phase noise would result in a higher incidence of secondary set channel symbols. The level of phase noise may be obtained by feedback from the far-end receiver. The level of phase noise does not need to be the exact value of the phase noise. For example, the receiver may take the magnitude of the phase error for a large number of received pilot symbols, determine whether the level of phase noise is too high, satisfactory or too low and then communicate said level to the transmitter. In another aspect, if the transmitter in and receiver share the same oscillator on both sides of the communication link, the level of phase noise in the far-end receiver may be approximated by the level of phase noise in the near-end receiver 220 comprised within the transceiver 200.

In the following, features of the fourth embodiment are described with reference to FIGS. 2-5. The fourth embodiment relates to a method in a transceiver 200 that is further comprising receiving 400 a message comprising channel symbols from the primary and secondary set 211, 212.

FIG. 5B shows a flowchart of the method according to the fourth embodiment. The method comprises the steps of receiving 530, determining 540, computing 550 and compensating 550.

The step of receiving 530 comprises receiving a message comprising channel symbols from the primary and the secondary set of channel symbols 211, 212. As mentioned earlier, FIG. 4 can be seen as an example on how the primary and secondary sets can be associated to channel symbols in a received message. The channel symbols using the secondary set 212 provides a known phase. A phase error can be determined by subtracting the known phase from the received channel symbol. At a given time t, any preceding channel symbol of the secondary set in the received message can be used to determine a preceding phase error 400A, 400B. Likewise, any subsequent channel symbol of the secondary set can be used to determine a subsequent phase error 410A, 410B. The step of determining 540 comprises determining a preceding phase error from a preceding received channel symbol, wherein the preceding received channel symbol is from the secondary set of channel symbols 212. The step of determining 540 may further comprise determining a subsequent phase error from a subsequent received channel symbol, wherein the subsequent received symbol is from the secondary set of channel symbols 212.

The step of computing 550 comprises computing a phase error estimate for a received channel symbol, wherein the phase error estimate is obtained from an estimator 221 having at least the preceding phase error as input. A simple realization of the estimator 221 is to provide a phase error estimate that is equal to the nearest preceding phase error in time. Alternatively, the estimator 221 may be a digital filter that take multiple preceding phase errors into account. If the step of determining comprises determining a subsequent phase error, the step of computing 550 may further comprise the estimator 221 having the subsequent phase error as input. A simple realization of the estimator 221 in this case is one that provides a linear interpolation between the nearest preceding and subsequent phase errors in time. Alternatively, the estimator 221 may a digital filter that take multiple preceding phase errors and multiple subsequent phase errors into account. For example, the estimator 221 may be a forward-backward Wiener filter that takes multiple preceding and subsequent phase errors as input.

Finally, the step compensating 560 comprises compensating for phase noise in the received channel symbol by subtracting the phase error estimate from the received channel symbol.

In the following, some alternative aspects of the four embodiments are described.

To recover some of the data rate loss while avoiding the pilot phase ambiguity associated with phase shift keying pilots, the present invention may use amplitude modulated pilots (i.e., to use amplitude shift keying, or "ASK"). This does not mean that the same quadrant of the signal constellation has to be used all the time, only that the phases of the transmitted pilots are known to the receiver. Using the same quadrant for all pilots may cause spectrum mask compliance issues.

To maximize the efficiency of the scheme the invention allows that the size of the ASK constellation varies with the SNR. When operating conditions are such that a link uses high order modulation and has low BER, one chooses a large ASK constellation. On the other hand, if a fading event occurs and the SNR degrades, one switches to a smaller constellation or even to the conventional approach where no data is encoded onto the pilots. The amplitudes of the ASK symbols should be chosen with both BER performance and phase estimation quality in mind.

As an example, if a system runs with 4096-QAM and there is good margin to the SNR threshold at which a switch is made to a smaller constellation, one may use an ASK constellation with 16 or even 32 symbols which encode 4 and 5 bits per symbol, respectively, and hence recovers 33% and 42% of the data rate loss. If the SNR is reduced, one may reduce the number of ASK symbols by omitting the pilots at lower amplitudes which from a phase reference point of view are more sensitive to SNR degradation due to their closer proximity to the origin of the I/Q plane.

An advantage with the invention is that the data throughput is increased by encoding data onto the pilots, while avoiding the drawback of phase ambiguity that exists in other such solutions. The scheme uses adaptable pilot constellation size, so that for big QAM constellations one could recover several of the bits that would normally be lost due to pilot transmission, if the conditions are such that the BER is low. When conditions worsen, one could, e.g., switch to binary ASK, or even the conventional scheme of pilots who don't encode any data at all.

Which pilot constellation to use is determined based on which QAM constellation is currently used for the payload traffic and/or feedback from the receiver about the SNR or MSE of the demodulated signal. Which pilot constellation to use may further be determined based on the level of phase noise. In favorable conditions, i.e., when the SNR is sufficiently high, one may choose a large ASK constellation for the pilots, as illustrated in FIG. 3 where 1024-QAM is used for the payload data and 16-ASK for the pilots. Note that all ASK symbols have the same phase and there is hence no phase ambiguity for the pilots in the receiver, as would be the case if the phase was used to encode information. The minimum distance between symbols in the pilot constellation is chosen to be essentially the same as the minimum distance between the QAM symbols. In this case, one would recover 40% of the data rate loss caused by using pilots, since 1024-QAM encodes 10 bits per symbol and 16-ASK 4 bits.

If SNR degrades, one may switch so that smaller ASK constellations are used for the pilots. For example, if 1024-QAM is used for payload data and 8-ASK and 4-ASK are used for the pilots, respectively, one would recover 30% and 20% of the data rate loss. One may also choose to switch to the conventional scheme where the pilots are known both in amplitude and phase and hence encodes no data. In this case the data rate loss is the same as the pilot overhead.

As a final remark we would like to emphasize that one does not have to use a constant phase for the ASK pilots, which may cause problems with spectrum mask compliance. One can vary the phase according to some given pattern known to the receiver to avoid a DC component in the spectrum.

Figure 6:
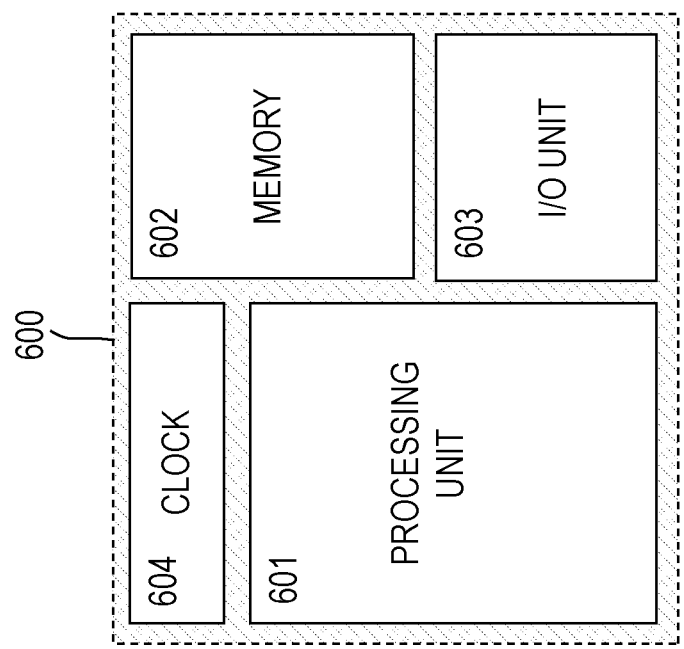
FIG. 6 shows schematically an example of a hardware implementation of the present invention.

According to yet another aspect of the invention, the transceiver 200 may be implemented as a processing unit 601, a memory 602, input/output unit 603 and a clock 604 as is illustrated in FIG. 6. The processing unit 601, the memory 602, the I/O unit 603 and the clock 604 may be interconnected. The processing unit 601 may comprise a central processing unit, a digital signal processor, a multi-processor system, programmable logic, a field programmable gate array (FPGA) or an application specific integrated circuit (ASIC) or any other type of logic. The memory 602 may comprise random access memory (RAM), read only memory (ROM) or any other type of volatile or non-volatile memory. The I/O unit 603 may comprise circuitry for controlling and performing signal conversions on I/O data and may further be connected to an antenna.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The invention claimed is:

1. A transceiver for phase-aided communication, the transceiver comprising a radio transmitter configured to transmit a message comprising channel symbols from a primary and a secondary set of channel symbols, wherein:
   the primary set of channel symbols comprises channel symbols having different phase with respect to one another;
   the secondary set of channel symbols comprises only channel symbols with a fixed known phase, wherein the channel symbols of the secondary set have a minimum signal energy that is dependent on signal-to-noise-ratio or signal-to-interference-and-noise-ratio; and
   the primary set is the default channel symbol set and the secondary set is selected based on a predetermined sequence or with regard to the level of phase noise.

2. The transceiver according to claim 1, further comprising a radio receiver configured to receive a message comprising channel symbols from the primary and the secondary set of channel symbols, wherein the receiver is configured to:
   determine a preceding phase error from a preceding received channel symbol, wherein the preceding received channel symbol is from the secondary set of channel symbols;
   compute a phase error estimate for a received channel symbol, wherein the phase error estimate is obtained from an estimator having at least the preceding phase error as input; and
   compensate for phase noise in the received channel symbol by subtracting the phase error estimate from the received channel symbol.

3. The transceiver according to claim 2, wherein the receiver is further configured to determine a subsequent phase error from a subsequent received channel symbol, wherein the subsequent received channel symbol is from the secondary set of channel symbols, and the estimator is having the subsequent phase error as input.

4. The transceiver according to claim 1, wherein the primary set of channel symbols comprises QAM signals.

5. The transceiver according to claim 1, wherein the secondary set of channel symbols comprises ASK signals.

6. The transceiver according to claim 1, wherein the minimum distance between channel symbols in the primary set and secondary set is essentially the same.

7. A method in a transceiver, the transceiver being configured to transmit a message comprising channel symbols from a primary and a secondary set of channel symbols, the method comprising the steps of: selecting a channel symbol from either the primary or the secondary set of channel symbols, wherein the primary set of channel symbols comprises channel symbols having different phase with respect to one another and is the default channel symbol set, and the secondary set of channel symbols comprises only channel symbols with a fixed known phase and is selected based on a predetermined sequence or with regard to the level of phase noise, wherein the channel symbols of the secondary set have a minimum signal energy that is dependent on signal-to-noise-ratio or signal-to-interference-and-noise-ratio; and
   transmitting the channel symbol.

8. The method according to claim 7, further comprising the steps of:
   receiving a message comprising channel symbols from the primary and the secondary set of channel symbols;
   determining a preceding phase error from a preceding received channel symbol, wherein the preceding received channel symbol is from the secondary set of channel symbols;
   computing a phase error estimate for a received channel symbol, wherein the phase error estimate is obtained from an estimator having at least the preceding phase error as input; and
   compensating for phase noise in the received channel symbol by subtracting the phase error estimate from the received channel symbol.

9. The method according to claim 8, wherein the step of determining further comprises determining a subsequent phase error from a subsequent received channel symbol, wherein the subsequent received channel symbol is from the secondary set of channel symbols, and wherein the step of computing further comprises the estimator having the subsequent phase error as input.

10. The method according to claim 7, wherein the primary set of channel symbols comprises QAM signals.

11. The method according to claim 7, wherein the secondary set of channel symbols comprises ASK signals.

12. The method according to claim 7, wherein the minimum distance between channel symbols in the primary set and secondary set is essentially the same.

* * * * *